(12) United States Patent
Padiou et al.

(10) Patent No.: US 11,472,141 B2
(45) Date of Patent: Oct. 18, 2022

(54) METHOD FOR ADDITIVELY MANUFACTURING AN OPTHALMIC LENS AND OPTHALMIC LENS

(71) Applicant: Essilor International, Charenton-le-Pont (FR)

(72) Inventors: Jean-Marc Padiou, Charenton-le-Pont (FR); Mathieu Feuillade, Charenton-le-Pont (FR); Alexandre Gourraud, Charenton-le-Pont (FR); Loïc Quere, Charenton-le-Pont (FR); Olivier Roussel, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 25 days.

(21) Appl. No.: 16/770,361

(22) PCT Filed: Dec. 5, 2018

(86) PCT No.: PCT/EP2018/083696
§ 371 (c)(1),
(2) Date: Jun. 5, 2020

(87) PCT Pub. No.: WO2019/110689
PCT Pub. Date: Jun. 13, 2019

(65) Prior Publication Data
US 2020/0298512 A1    Sep. 24, 2020

(30) Foreign Application Priority Data
Dec. 6, 2017  (EP) ..................... 17306711

(51) Int. Cl.
*B29D 11/00*  (2006.01)
*B33Y 80/00*  (2015.01)

(52) U.S. Cl.
CPC .... *B29D 11/00432* (2013.01); *B29D 11/0073* (2013.01); *B33Y 80/00* (2014.12)

(58) Field of Classification Search
CPC .......... B29D 11/00432; B29D 11/0073; B33Y 80/00; B33Y 10/00; B29C 64/112; B29C 64/40; B29C 65/48
See application file for complete search history.

(56) References Cited

U.S. PATENT DOCUMENTS 5,861,934 A * 1/1999 Blum ..................... G02C 7/061
351/159.46
2008/0023137 A1  1/2008 Jiang et al.
(Continued)

FOREIGN PATENT DOCUMENTS

EP  0 975 993  2/2000
EP  2 878 989  6/2015
(Continued)

OTHER PUBLICATIONS

International Search Report, PCT/EP2018/083696, dated May 13, 2019.
(Continued)

*Primary Examiner* — Mathieu D Vargot
(74) *Attorney, Agent, or Firm* — Nixon & Vanderhye

(57) ABSTRACT

A method of manufacturing an ophthalmic lens, including: a step of providing a starting optical system (30) having a first optical function and a first main refractive index; a step of providing a transition layer (20) intended to be disposed between the starting optical system (30) and a complementary optical element (12) having a second main refractive index, the transition layer (20) aiming at reducing unwanted reflection caused by the mismatch between the first and the second main refractive index, the transition layer (20) having a transition optical function; and a step of additively manufacturing the complementary optical element (12) on (Continued)

Figure 1:
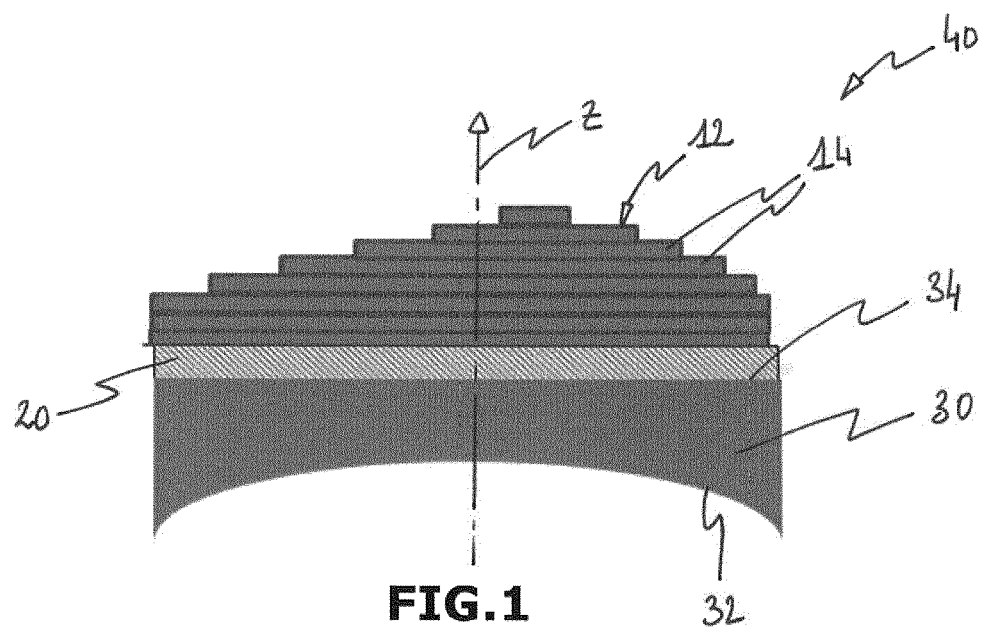

the transition layer (20), the complementary optical element (12) having a second optical function, the second optical function being predetermined as a function of the first optical function and of the transition optical function.

10 Claims, 2 Drawing Sheets

(56) References Cited

U.S. PATENT DOCUMENTS

| | | |
|---|---|---|
| 2008/0254210 A1 | 10/2008 | Lai et al. |
| 2009/0091825 A1 | 4/2009 | Saito et al. |
| 2015/0241714 A1 | 8/2015 | Allione et al. |

FOREIGN PATENT DOCUMENTS

| | | |
|---|---|---|
| KR | 2016 0029107 | 3/2016 |
| WO | WO 97/42530 | 11/1997 |

OTHER PUBLICATIONS

European Search Report, EP 17 30 6711, dated May 24, 2018.
Written Opinion, PCT/EP2018/083696, dated May 13, 2018.

\* cited by examiner

METHOD FOR ADDITIVELY MANUFACTURING AN OPTHALMIC LENS AND OPTHALMIC LENS

The invention relates to the field of the manufacture of ophthalmic lenses obtained at least partly by additive manufacturing. More particularly, the invention relates to a method of manufacturing an ophthalmic lens having a complementary optical element obtained by additive manufacturing and a transitional layer reducing unwanted reflection.

Methods for manufacturing ophthalmic lenses with a complementary optical element obtained by additive manufacturing are known. With additive manufacturing methods, the complementary optical element is formed by the deposition of a plurality of predetermined volumes of material. Particularly, the complementary optical element is generated by adding thin layers of material one on top of the other. This complementary optical element is intended to be disposed onto a starting optical system to form an ophthalmic lens. For different technical reasons, the starting optical system and the complementary optical element may have different refractive indexes. Indeed, the starting optical system is usually provided with a reduced thickness because of the addition of the complementary optical element. To obtain a starting optical system with reduced thickness, the starting optical system must have a high refractive index. To the contrary, current materials used for additively manufacturing the complementary optical element have a low refractive index which is particularly preferred to minimize power effects induced by the external surface of the complementary optical element (surface waves). This refractive index difference between the complementary optical element and the starting optical system brings a reflection surface at the interface therebetween, leading the ophthalmic lens to have visible unaesthetic fringes.

A known solution of U.S. Pat. No. 4,679,918 is to reduce the difference between the two refractive indexes by providing the starting optical system and the complementary optical element with materials having close refractive indexes. However, this solution does not allow to benefit from the thickness/weight reduction provided by a starting optical system with a reduced thickness and/or a material compatible with additive manufacturing.

A problem that the invention aims to solve is thus to provide a method allowing to manufacture an ophthalmic lens with reduced reflection issues at the interface between the complementary optical element obtained by additive manufacturing and the starting optical system, while maintaining a significant difference between the refractive indexes thereof.

To solve this problem, the invention provides a method of manufacturing an ophthalmic lens having a desired optical function, the ophthalmic lens comprising a starting optical system having a first main refractive index and a complementary optical element having a second main refractive index, the difference between the first main refractive index and the second main refractive index being superior or equal to 0.1, each of the starting optical system and of the complementary optical element providing a part of the optical function of the ophthalmic lens, the method comprising:

a step of providing the starting optical system, the starting optical system having a first optical function, a step of providing a transition layer intended to be disposed between the starting optical system and the complementary optical element, the transition layer aiming at reducing unwanted reflection caused by the mismatch between the first and the second main refractive index, the transition layer having a transition optical function, and a step of additively manufacturing the complementary optical element on the transition layer, the complementary optical element having a second optical function, the second optical function being predetermined as a function of the first optical function and of the transition optical function in order to match the desired optical function of the ophthalmic lens.

Providing the ophthalmic lens with a transition layer as described above and first and second main refractive indexes difference superior or equal to 0.1 allows to reduce or even suppress reflection effects due to the difference between the first and second main refractive indexes. As indicated above, a significant difference between first and second main refractive indexes allows to reduce thickness and weight of the starting optical system and to minimize power effects induced by the external surface of the complementary optical element (surface waves).

According to an embodiment of the manufacturing method, the step of providing the transition layer comprises a step of providing at least two materials with a first and a second transition refractive indexes, respectively.

According to an embodiment of the manufacturing method, first and second transition refractive indexes are between the first and second main refractive indexes.

According to an embodiment of the manufacturing method, the ophthalmic lens defines a thickness axis, the step of providing the transition layer comprising a step of distributing said at least two materials so that the amount of each of said at least two materials varying in the transition layer along the thickness axis.

According to an embodiment of the manufacturing method, said at least two materials are distributed in the transition layer so that first and second transition refractive indexes form a refractive index gradient between first and second main refractive indexes along the thickness axis.

According to an embodiment of the manufacturing method, said at least two materials are distributed in the transition layer so that first and second transition refractive indexes form a stochastic distribution along the thickness axis.

According to an embodiment of the manufacturing method:

the amount of material having the first transition refractive index is greater than the amount of material having the second transition refractive index near the starting optical system, and the amount of material having the second transition refractive index is greater than the amount of material having the first transition refractive index near the complementary optical element.

According to an embodiment of the manufacturing method, the transition layer is anti-reflective layer.

According to an embodiment of the manufacturing method, the transition layer is obtained by at least one among spin, inkjet or dip coating methods, physical vapor deposition and additive manufacturing technologies such as polymer jetting and stereolithography.

The invention also concerns an ophthalmic lens obtained by a manufacturing method as described above, the complementary optical element being obtained by additive manufacturing by depositing a plurality of predetermined volume elements on the transition layer.

According to an embodiment of the ophthalmic lens, the starting optical system is greater than or equal to 50%, preferably 60%, more preferably 67%, and the complementary optical element is lower than or equal to 50%, preferably 40%, more preferably 33%, of the total weight or volume of the starting optical system and the complementary optical element.

According to an embodiment of the ophthalmic lens, the first main refractive index is greater than or equal to 1.58, preferably 1.6, more preferably 1.67, more preferably 1.74, the second main refractive index is lower than or equal to 1.6, preferably 1.5, wherein the first main refractive index is greater than the second main refractive index.

According to an embodiment of the ophthalmic lens, the transition layer comprises at least two materials with a first and a second transition refractive indexes, respectively.

According to an embodiment of the ophthalmic lens, an arithmetic mean is defined between first and second main refractive indexes, the first transition refractive index being lower than the arithmetic mean, the second transition refractive index being greater than the arithmetic mean.

According to an embodiment of the ophthalmic lens, the ophthalmic lens defines a thickness axis, first and second transition refractive indexes form a refractive index gradient between first and second main refractive indexes along the thickness axis.

The invention is described in more detail below by way of the figures that show a preferred embodiment of the invention.

FIG. 1 schematically shows an ophthalmic lens comprising a complementary optical element obtained by the deposition of predetermined volumes on a starting optical system as well as a transition layer between the starting optical system and the complementary optical element.

Figure 2:
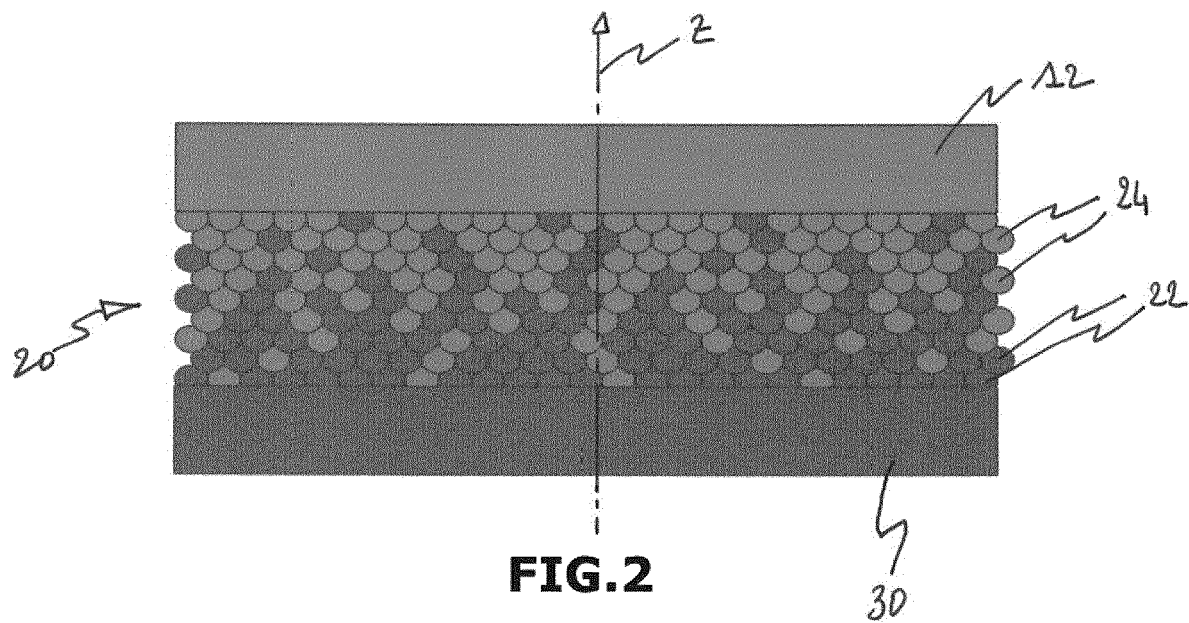

FIG. 2 schematically shows a detailed view of an embodiment of the transition layer disposed between the starting optical system and the complementary optical element, the transition layer comprising first and second materials.

Figure 3:
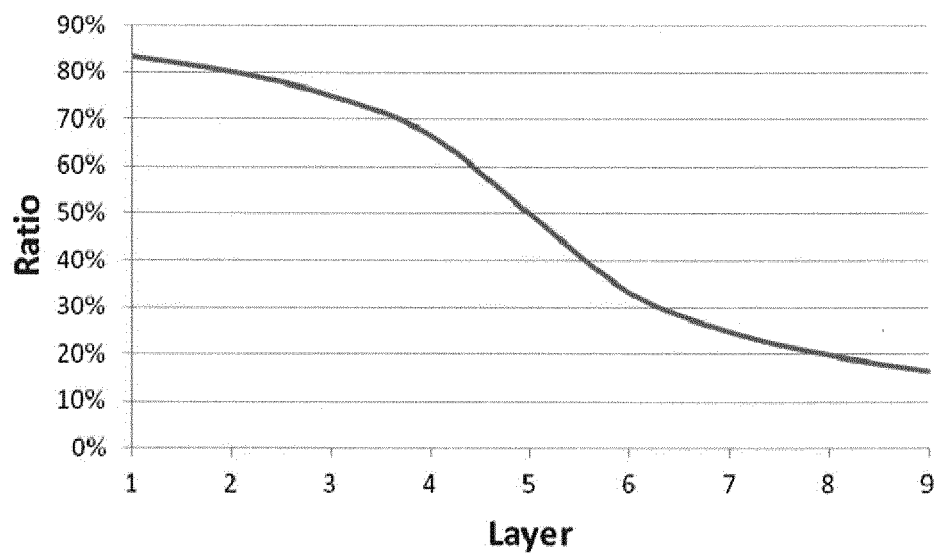
Figure 4:
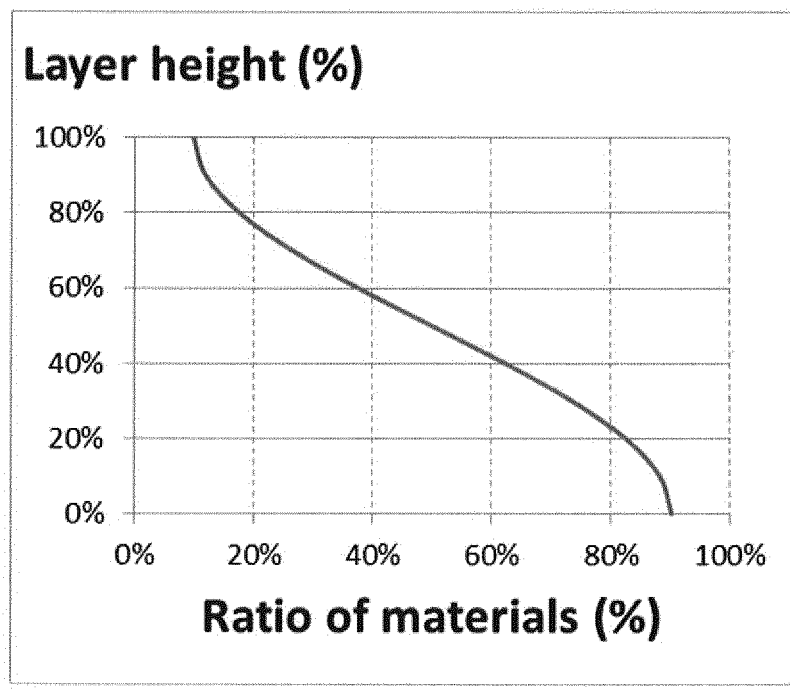

FIGS. 3 and 4 each show a diagram illustrating the ratio of volume or weight between the first and the second materials depending on the altitude in the transition layer.

As shown on FIG. 1, an ophthalmic lens 40 comprising a starting optical system 30 having a first optical function and a complementary optical element 12 having a second optical function and intended to be disposed on the starting optical system 30. A method for manufacturing such an ophthalmic lens 40 is also provided. The ophthalmic lens 40 has a desired optical function depending at least on the first and second optical functions.

It will be recalled that the optical function of a lens, of a system or of an optical element means the optical response of this lens or of this system or of this element, namely a function that defines any modification in the propagation and transmission of an optical beam through the lens, the system or the optical element concerned, whatever the angle of incidence of the incident optical beam and whatever the geometric extent of an input diopter illuminated by the incident optical beam. Said desired optical function may be simple or complex.

More specifically, in the field of ophthalmics, the optical function is defined as the distribution of wearer power and astigmatism characteristics and of higher-order aberrations associated with the lens, with the system or with the optical element for all the directions of gaze of a wearer of this lens, of this system or of this element. That of course assumes that the geometric positioning of the lens, of the system or of the optical element with respect to the eye of the wearer has been predetermined.

It will be noted that it is chiefly the complementary optical element 12 which confers the optical function on the ophthalmic lens 40, even if the starting optical system 30 already has a simple or complex optical function. In other words, without this complementary optical element 12, the ophthalmic lens 40 cannot exhibit the optical function prescribed for it. This complementary optical element 12 therefore has nothing to do with a simple surface coating, such as an antireflective coating, an antifog coating, a scratchproof coating or even a dirt-resistant coating.

The complementary optical element 12 is obtained by a step of additively manufacturing the complementary optical element 12 by depositing a plurality of predetermined volume elements 14 directly on the starting optical system 30 or on a build support (not shown) and then transferred on the starting optical system 30. In this latter case, an additional step of assembling the complementary optical element 12 to the starting optical system 30 is performed to obtain the ophthalmic lens 40. The complementary optical element 12 is formed by the plurality of predetermined volume elements 14 which are juxtaposed and superposed to form a plurality of superposed layers of a material. A thickness axis Z of the complementary optical element 12 is defined. Preferably, the thickness axis Z is perpendicular to the surface of the complementary optical element 12 facing the starting optical system 30.

It will be noted that additive manufacturing here corresponds to a three-dimensional printing or stereolithography method, or even to a method of fused filament fabrication. Preferably, the additive manufacture is one among polymer jetting and stereolithography.

On FIG. 1, the complementary optical element 12 has a curved, more specifically convex, front side and a planar back side. Depending on the desired optical function of the ophthalmic lens 40, the front and back sides of the complementary optical element 12 may be each planar or curved. Shape or profile of the complementary optical element 12 is determined depending on the desired optical function of the ophthalmic lens 40. In this instance, "planar" does not necessarily mean "smooth" and does not necessarily exclude the presence of roughness. Furthermore, "planar" surface means that this surface has a curvature close to zero.

This starting optical system 30 is preferably made of a material generally used for the manufacture of ophthalmic lens, such as the allylic polymer known by the name CR39. The starting optical system 30 may also be made of polycarbonate or thiourethane (also known as MR-7 polymer). The starting optical system 30 may be manufactured by casting, injection, surfacing or by additive manufacturing.

The starting optical system 30 is preferably a thin lens which power is around the planned Rx. Particularly, the starting optical system 30 has a local thickness which is higher than 0.3 mm and preferably higher than 0.5 mm. The starting optical system 30 may be spherical, torical or progressive. Depending on the desired optical function, front and back sides of the starting optical system 30 may be each planar or curved.

The starting optical system 30 comprises a first surface 32 intended to face an eye of a user when the ophthalmic lens 40 is mounted on a frame (not shown) worn by the user, and a second surface 34 opposite to the first surface 32. On FIG. 1, the complementary optical element 12 faces the first surface 32. More generally, the complementary optical element 12 is disposed on either the first 32 or the second 34 surfaces of the starting optical system 30. Access to front side of the starting optical system 30 is easier but, for aesthetical or practical reasons, it should be preferred to put the complementary optical element 12 on the back side. Particularly, the complementary optical element 12 is preferably disposed on the back side of the starting optical system 30 when the complementary optical element 12 brings a cylinder component to the ophthalmic lens 40, when the starting optical system 30 has added values on the front side (for example anti-adhesive properties) or when the complementary optical element 12 presents risks of damage (e.g. scratches). On the other hand, it is preferred to dispose the complementary optical element 12 on the front side if this complementary optical element 12 brings front added values to the ophthalmic lens 40.

The starting optical system 30 is provided with a first main refractive index and the complementary optical element 12 is provided with a second main refractive index. The first and second main refractive indexes are chosen so that the difference therebetween is superior or equal to 0.1. Particularly, the first main refractive index is preferably greater than or equal to 1.58, preferably 1.6, more preferably 1.67, more preferably 1.74. The second main refractive index is preferably lower than or equal to 1.6, preferably 1.5. Furthermore, the first main refractive index is preferably greater than the second main refractive index. In doing so, the starting optical system 30 can have a reduced thickness and weight by using a high refractive index material while the complementary optical element 12 can be made of a desired material compatible with additive manufacturing having a low refractive index.

The ophthalmic lens 40 also comprises a transition layer 20 intended to be disposed between the starting optical system 30 and the complementary optical element 12. The transition layer 20 aims at reducing unwanted reflection caused by the mismatch between the first and the second main refractive index. The transition layer 20 is preferably an anti-reflective layer. Furthermore, the transition layer has a transition optical function. The second optical function is predetermined as a function of the first optical function and of the transition optical function in order to match the desired optical function of the ophthalmic lens 40.

The transition layer 20 may be obtained by at least one among spin, inkjet or dip coating methods, physical vapor deposition and additive manufacturing technologies such as polymer jetting and stereolithography.

The transition layer 20 is configured to have a transition refractive index. To reduce unwanted reflection, the transition layer 20 is provided so that the transition refractive index is between the first and the second main refractive indexes. Furthermore, the transition layer 20 may comprise a single material or at least two materials.

When the transition layer 20 comprises a single material or a single homogeneous material, the refractive index of the single material corresponds to the transition refractive index. A single material layer means that the transition layer 20 is made from a homogeneous layer having a single refractive index. As a consequence, the single material may comprise more than one material but form a homogeneous material. In other words, the transition layer 20 is made from miscible materials configured to form a homogeneous single material. When the transition layer 20 comprises a plurality of sublayers, all these sublayers are made from this single material. A sublayer corresponds to a thin extended element able to be overlaid with other sublayers or an external layer to form a layer, here the transition layer 20. When homogeneous, the transition layer 20 is preferably made of mineral colloids having a high refractive index as zirconium dioxide (ZrO2), titanium dioxide (TiO2), tin dioxide (SnO2) or Indium tin oxide (ITO). The mineral colloid concentration may be adjusted with another material to obtain a predetermined transition refractive index. The mineral colloids may also be low refractive index particles like hollow silica, with refractive index between 1.3 and 1.4. In this case, the refractive index of the homogeneous single material is adjusted as a function of the particle concentration in a higher refractive index matrix (solid-gel matrix or polymer matrix).

Such a transition layer 20 may be a hard coat made using spin, inkjet or dip coating technologies. This allows the transition layer 20 to be put on the starting optical system 30 at early stage of the manufacturing method without risking to damage it. In this case, the complementary optical element 12 is additively manufactured directly on the starting optical system 30 and the transition layer 20. For instance, if the first main refractive index of the starting optical system 30 is 1.74 and the second main refractive index of the complementary optical element 12 is 1.6, the transition refractive index may be 1.67.

Alternatively, the transition layer 20 may be formed using physical vapor deposition to deposit a homogeneous layer, for example with a mix of materials. For example, silicon dioxide (SiO2) which has a refractive index of 1.45 at 587 nm and zirconium dioxide (ZrO2) which has a refractive index of 2.158 at 587 nm may be used to have a transition layer 20 with a transition refractive index of 1.67.

When the transition layer 20 is made of at least two materials or a heterogeneous material comprising at least two materials, those materials have a first and a second transition refractive indexes, respectively. First and second transition refractive indexes are preferably between the first and second main refractive indexes. Materials having the first transition refractive index, i.e. a low refractive index, may be acrylic or epoxy base material with a low amount of aromatic cycles and sulfur atoms. Materials having the second transition refractive index, i.e. a high refractive index, may be bi-component mixtures inducing thiol-ene reaction or mixtures of episulfide and thiol compounds. Monomers with high percentage of sulfur atoms are preferred. Mixtures containing high refractive index mineral nanoparticles generally do not fit the requirements of this invention because they lead to mixtures with very high viscosity that is not compatible with standard printing heads used for polymer jetting technology. Indeed, mixtures with low viscosity are preferred for polymer jetting. Furthermore, material flow may be obstructed with low viscosity material making it difficult to ensure the homogeneity of the transition layer 20.

According to an embodiment, the first transition refractive index being lower than an arithmetic mean defined between first and second main refractive indexes. In this case, the second transition refractive index is greater than the arithmetic mean.

Furthermore, said at least two materials may be distributed so that the amount of each of said at least two materials varying in the transition layer 20 along the thickness axis Z. Particularly, said at least two materials may be distributed in the transition layer 20 so that first and second transition refractive indexes form a refractive index gradient between first and second main refractive indexes along the thickness axis Z. For obtaining the desired refractive index gradient, the transition layer 20 may be formed by a plurality of layers (see FIG. 2) wherein the ratio between the materials is modified along the thickness axis Z in the different layers. A progressive change in the mixing ratio may be performed to have a progressive transition between the first and the second transition refractive indexes. This ratio may refer to material volume or weight. Alternatively, said at least two materials may be distributed in the transition layer 20 so that first and second transition refractive indexes form a stochastic distribution along the thickness axis Z so as to avoid periodical effects.

To provide a progressive transition between the first and the second transition refractive indexes, the amount of material having the first transition refractive index is greater than the amount of material having the second transition refractive index near the starting optical system 30. To the contrary, the amount of material having the second transition refractive index is greater than the amount of material having the first transition refractive index near the complementary optical element 12.

As shown on FIG. 2, the transition layer 20 may be provided using printing technology or polymer jetting where the material is projected in droplets onto a substrate and then polymerized. The polymerization is provided by a photoinitiator that is defined depending on the polymerization process (radical, cationic, anionic) of the mixture of monomer. In this case, the transition layer 20 is made of a plurality of layers which are made of a plurality of droplets or voxels. Particularly, the transition layer 20 comprises first droplets 22 of material having the first transition refractive index and second droplets 24 of material having the second transition refractive index. To change the ratio between the two materials the ratio of the number of droplets of each material is changed for each layer of the transition layer 20. In this example, the transition layer 20 is made of 9 layers which have the following mixing ratio (second material 24/first material 22):5/1, 4/1, 3/1, 2/1, 1/1, 1/2, 1/3, 1/4, 1/5 as it can be seen on FIG. 3. Alternatively, the variation of material ratio may be expressed in a percentage of the layer thickness as shown on FIG. 4. FIGS. 3 and 4 show a diagram illustrating the ratio of volume or weight between the first and the second materials depending on the altitude in the transition layer. Conversely to FIG. 3, the diagram of FIG. 4 represents the ratio of materials in abscissa and the vertical position or altitude in the transition layer in ordinate.

When using a printing technology or polymer jetting, it is preferable that materials can be mixed together after deposit and before their polymerization in order to get after a layer with a refractive index which is function of the ratio of the materials. To obtain a horizontal continuity of index, materials are deposited together to let them mix. This is for example achieved with a manufacturing machine having at least two printing heads. In this case, printing heads are each connected to a tank of material different from each other, preferably a first material having the first transition refractive index and a second material having the second refractive index. It is also preferred not to cure immediately each droplet but to wait that materials are mixed and spread on the surface. Then the layer can be cured (e.g. with UV lighting) before depositing an additional layer.

Furthermore, the transition layer 20 may also be obtained by mixing at least two materials to obtain a heterogeneous layer. In other words, the transition layer 20 is made from non-miscible materials configured to form a heterogeneous layer. In this case, the transition layer 20 is preferably provided by physical vapor deposition (PVD) to deposit a mix of at least two materials having different refractive indexes, i.e. the first and second transition refractive indexes. A typical variation of refractive index in the layer is a sinusoidal variation:

$$N = nb - \Delta N * \sin(2\pi * x/T)$$

with $\Delta N = nb - nl$, nb being the first main refractive index of the starting optical system 30, nl being the second main refractive index of the complementary optical element 12, x being the distance to the starting optical system 30 along the thickness axis Z, and T being the period of refractive index variation; T is preferably equal to $\lambda/2$ ($\lambda$ being the reference visible wavelength, for instance 550 nm).

Furthermore, the thickness of the transition layer 20 is preferably chosen so that optical thickness is equal to quarter of the representative of visible wavelength, i.e. $\lambda/4$. It will be recalled that the optical thickness depends on the refractive index of the medium and of the thickness of the layer. Particularly, the optical thickness is determined as follows:

$$\text{Optical thickness} = nc * \text{thickness of the layer}$$

with nc being the transition refractive index.

Moreover, the starting optical system 30 is preferably greater than or equal to 50%, preferably 60%, more preferably 67%, and the complementary optical element 12 is lower than or equal to 50%, preferably 40%, more preferably 33%, of the total weight or volume of the starting optical system 30 and the complementary optical element 12. Indeed, to improve the advantage of reducing the thickness of the starting optical system 30, it is preferred that the starting optical system 30 is an important part of the ophthalmic lens 40. In doing so, the benefit of providing the starting optical system 30 with a high refractive index is greater than additively manufacturing a part of the ophthalmic lens 40, i.e. adding the complementary optical element 12.

As an example, if we take a complementary optical element 12 has a second main refractive index of 1.5 with a material density equal to CR39 which provides an addition of 2 dioptries without any change in far power with an oval contour of width 60 mm*height 40 mm which has a 2.5 mm horizontal offset, this complementary optical element 12 has a volume of 884 mm3 and weights 1.06 g. With a prescription of "Sphere-2 dioptries Cylinder-1 dioptry and axis 0 degree" on a same contour, a standard ophthalmic lens made of CR39 has a volume of 5494 mm3 and weights 6.59 g. To the contrary, if we use an ophthalmic lens 40 as described here, the starting optical system 30 with a first main refractive index of 1.67 with material density of MR-7 has a volume of 3917 mm3 and weights 5.33 g. Therefore, the standard ophthalmic lens weighs more than the addition of the complementary optical element 30 and the starting optical system 30 so that is advantageous to manufacture an ophthalmic lens 40. This gain is all the more increased that the starting optical system 30 is an important part of the ophthalmic lens 40.

An additional step of gluing may be also provided in which a gluing element or an adhesive having adhesion properties is provided to or comprised in the complementary optical element 12 and/or the starting optical system 30. In the first case, this gluing element may be a gluing layer disposed between two layers of the ophthalmic lens 40. Polymer jetting technology is preferred to deposit the glue layer on a selected area. Most preferably, the same equipment is used for manufacturing the glue layer and the complementary optical element 12. Another advantage of polymer jetting technology is that additive manufacturing machine can have multiple printing heads with various materials. The glue layer may also be deposited by spin or spray coatings. Particularly, spin coating is preferred when deposited onto the starting optical system 30 and spray coating is preferred when deposited onto the build support. These spin and spray coatings are specifically interesting to deposit a pressure sensitive adhesive. The gluing element 5 may be chosen to be activated with light, by thermal curing or by pression.

When the complementary optical element 12 is not directly deposited on the starting optical system 30 and the transition layer 20, an additional step of edging may be performed to edge the build support before adding the complementary optical element 12. This is particularly advantageous in case of important risks of delamination during edging step. It can also help the alignment of the complementary optical element 12 on the starting optical system 30. Alternatively, the edging step may be performed after adding the complementary optical element 12.

The invention claimed is:

1. A method of manufacturing an ophthalmic lens having a desired optical function, the ophthalmic lens comprising a starting optical system having a first main refractive index and a complementary optical element having a second main refractive index, the difference between the first main refractive index and the second main refractive index being superior or equal to 0.1, each of the starting optical system and the complementary optical element providing a part of the desired optical function of the ophthalmic lens, the ophthalmic lens defining a thickness axis, the method comprising:
   a step of providing the starting optical system, the starting optical system having a first optical function,
   a step of providing a transition layer intended to be disposed between the starting optical system and the complementary optical element, the transition layer reducing unwanted reflection caused by the mismatch between the first and the second main refractive index, the transition layer having a transition optical function, said step of providing the transition layer comprising:
   providing at least two materials with a first and a second transition refractive index, respectively;
   distributing said at least two materials so that the amount of each of said at least two materials varies in the transition layer along the thickness axis, said at least two materials being distributed in the transition layer so that first and second transition refractive indexes form a refractive index gradient between first and second main refractive indexes along the thickness axis, and
   a step of additively manufacturing the complementary optical element on the transition layer to obtain the ophthalmic lens, the complementary optical element having a second optical function, the second optical function being predetermined as a function of the first optical function and of the transition optical function in order to match the desired optical function of the ophthalmic lens.

2. The method according to claim 1, wherein the first and second transition refractive indexes are between the first and second main refractive indexes.

3. The method according to claim 1, wherein said at least two materials are distributed in the transition layer so that first and second transition refractive indexes form a stochastic distribution along the thickness axis.

4. The method according to claim 1, wherein:
   the amount of material having the first transition refractive index is greater than the amount of material having the second transition refractive index near the starting optical system, and
   the amount of material having the second transition refractive index is greater than the amount of material having the first transition refractive index near the complementary optical element.

5. The method according to claim 1, wherein the transition layer is an anti-reflective layer.

6. The method according to claim 1, wherein the transition layer is obtained by at least one of spin coating, inkjet, dip coating, physical deposition and additive manufacturing.

7. An ophthalmic lens obtained by a manufacturing method according to claim 1, the complementary optical element being obtained by additive manufacturing by depositing a plurality of predetermined volume elements on the transition layer.

8. The ophthalmic lens according to claim 7, wherein the starting optical system is greater than or equal to 50%, and the complementary optical element is lower than or equal to 50%, of the total weight or volume of the starting optical system and the complementary optical element.

9. The ophthalmic lens according to claim 7, wherein the first main refractive index is greater than or equal to 1.58, the second main refractive index is lower than or equal to 1.6, wherein the first main refractive index is greater than the second main refractive index.

10. The ophthalmic lens according to claim 7, wherein an arithmetic mean is defined between first and second main refractive indexes, the first transition refractive index being lower than the arithmetic mean, the second transition refractive index being greater than the arithmetic mean.

* * * * *